United States Patent
Kupke

(12) 
(10) Patent No.: US 6,733,670 B2
(45) Date of Patent: May 11, 2004

(54) APPARATUS AND METHOD FOR REHABILITATING A TRAVELING BRIDGE FILTER UNDERDRAIN

(75) Inventor: John A. Kupke, Annapolis, MD (US)

(73) Assignee: Parkson Corporation, Fort Lauderdale, FL (US)

( * ) Notice: Subject to any disclaimer, the term of this patent is extended or adjusted under 35 U.S.C. 154(b) by 161 days.

(21) Appl. No.: 09/782,162

(22) Filed: Feb. 14, 2001

(65) Prior Publication Data

US 2002/0113001 A1 Aug. 22, 2002

(51) Int. Cl.[7] .............................................. B01D 24/46
(52) U.S. Cl. .................. 210/271; 210/275; 210/293
(58) Field of Search ................................ 210/275, 291, 210/293, 271, 273

(56) References Cited

U.S. PATENT DOCUMENTS 4,842,732 A  * 6/1989 Tharp ........................ 210/220
4,882,053 A  * 11/1989 Ferri ........................ 210/293

* cited by examiner

Primary Examiner—Robert James Popovics
(74) Attorney, Agent, or Firm—Baker Botts L.L.P.

(57) ABSTRACT

A porous media support plate module may be used to construct a new filter underdrain or to rehabilitate an existing filter underdrain. A porous plate replacement module may be inserted between two existing cell dividers to replace a damaged porous media support plate, which may be allowing media leakage. The design of the replacement module provides an improved plenum structure, which enhances the backwash process and reduces the drawbacks of applying adhesives in varying weather conditions. In an alternative design, a module may be provided to enhance the backwash process of existing cells.

7 Claims, 6 Drawing Sheets

APPARATUS AND METHOD FOR REHABILITATING A TRAVELING BRIDGE FILTER UNDERDRAIN

BACKGROUND OF THE INVENTION

1. Field of the Invention

The present invention relates to traveling bridge filter systems. In general, the invention is directed toward an improved system of installing porous media support plates and/or replacing plates which are failing or leaking. More particularly, the improvement is a prefabricated plate support system, which allows the direct installation of porous media support plates or replacement of porous media support plates in an existing filter. In addition, the present invention is directed to providing a cell structure that enhances the backwash process.

2. Description of the Related Technology

Water treatment often involves a filtering process to remove solids from water being treated. During a water filtering process, a layer of solids develops on the surface of a filter media. At is optimum the layer results in beneficial and substantial removal of solids from the water being filtered. However, as the quantity of material forming the layer increases, the permeability of the filter bed decreases. In order to overcome an excessive reduction in permeability, conventional filter systems backwash the entire filter area, thus requiring large flow rates and large volumes of backwash water, i.e., the waste by-product of filtering. The success of traveling bridge filters, on the other hand, depends to a large extent on the filter system's ability to backwash small, individual sections, often referred to as cells, of granular filtration media with water to periodically clean the filtration media using a cell structure to minimize the area of the filtration media to be cleaned reduces the amount of waste by-product. Traveling bridge filter systems are well known in the field of waste water management. These systems are exemplified in U.S. Pat. Nos. 3,239,061, 4,152,265, and 5,234,600 the disclosures of which are expressly incorporated by reference herein.

FIG. 1 shows a perspective view of a typical prior art traveling bridge filter 10. A concrete tank having a slab 20, influent wall 21, and effluent wall 22, contains a plenum section 13 having a plurality of cells 12 separated by cell dividers 121. Media 25 is placed on media retention plates 145 in each cell of the plenum section. Commonly, sand is used as a filtration media, but other materials such as anthracite, garnet, or carbon, may also be used. Traveling bridge 101 travels along tracks 15 installed at the top of the influent and effluent walls.

In both the prior art and the present filter systems, during filtering, influent water is delivered to the filter compartment through influent openings 211 in the influent wall 21. The influent water maintains a level over the surface of the granular filter media 25 such that the downward flow of influent water is more or less uniform across the entire surface area of the filter media. Solids in the influent water are deposited on the surface of the media 25, and the filtered water enters through the media retention plates 145 at the top of the plenum section 13 and exits through filtrate effluent openings 221 installed in the effluent wall 22.

During backwashing of the prior art traveling bridge filter, backwash water pump 26 located near filtrate effluent openings 221 forces backwash water into a particular cell of the plenum section 13 through a filtrate effluent opening. The water is forced up through the media retention plates 145 of the cell, and it loosens solids from the surface of the media 25. Waste water pump 27 mounted on washwater hood 28 removes the loosened solids, suspended in the backwash water, at the surface of the media 25 via a waste water pipe in the hood. Traveling bridge 101 and supports 11 are used to transport backwash water pump 26, waste water pump 27, and washwater hood 28 from one cell to the next cell during the backwash cycle.

The individual cells, which are required for the traveling bridge filter, may be constructed using fiberglass-reinforced polyester (FRP) sheets as cell dividers, plastic end sections, FRP support angles (either integral to cell dividers or attached separately), FRP hold down angles, porous media support plates, adhesive/sealant, a variety of hardware types, and leveling channels. This equipment is used to construct individual cells that are substantially hydraulically separated from other cells. In the present art, the cell dividers are used to:

1. divide the filtration media into individual compartments;
2. form the sidewalls of the plenum compartments; and
3. support the porous plates.

This multiple utility requires that great care be taken to avoid installation errors so that all the required purposes are properly met.

The installation of prior filters requires many steps and hardware; some steps require the presence of a technician. The details of installing a filter underdrain system made be found in U.S. patent application Ser. No. 09/122,801, filed Jul. 27, 1998, entitled Underdrain Filter With Prefabricated Cells, which is hereby incorporated by reference.

In the past, the rehabilitation of an existing filter underdrain is very labor intensive, and the filter must be taken out of service for a substantial amount of time. The repair work is tedious and typically requires both factory supervision and skilled, properly equipped, workers. Referring to FIG. 2 in the prior art, replacement of existing porous media support plates involves the following steps:

1. removing the existing media (25);
2. removing existing retention angles (205) and porous plates (204);
3. cleaning the plate support ledge thoroughly (203);
4. applying sealant/adhesive (206) to plate support ledge (203);
5. installing new porous plates (204);
6. applying sealant/adhesive (207) around the periphery of the plate (204);
7. performing a "light test";
8. installing new retention angle (205);
9. installing new media.

After installing the porous plates, a "light test" is performed. This test must be performed when the sun is down, preferably at the darkest time of the night. During the test, a bright light is inserted into the plenum under the porous plates. As the light is withdrawn from a cell, an observer on the top side of the porous plates watches for any light to shine through, which indicates a leak that filtration media could pass through. The light spots, which commonly occur even with careful workmanship, must be repaired by topically applying additional sealant/adhesive. Finally, the filtration media may be replaced in the cell compartments to complete the construction of the filter's underdrain. These requirements are similar to the original installation requirements, as described in the references cited above.

As with installation, this method of reconstruction has numerous drawbacks, such as the amount of time required to rehabilitate the filter. In addition, this method requires that a technician be present during installation. Furthermore, due to the environmental conditions during installation, the adhesive used to create a seal around the porous plate may be weaken. Moreover, the use of sealants/adhesives during installation results in component breakage when attempting to disassemble the filter. Great care must be taken to avoid installation errors so that all the parts function properly and as intended.

SUMMARY OF THE INVENTION

An object of the invention is to provide an underdrain rehabilitation system for traveling bridge filters.

Another object of the invention is to reduce the time a filtration system is out of commission for repairs.

Another object of the invention is to permit a portion of a filter to be rehabilitated without disrupting other sections of the filter.

Another object of the invention is to provide a rehabilitation system that allows builders flexibility in budgeting by eliminating the "all or nothing" replacement of a filter underdrain.

Another object of the invention is to provide a porous plate module that reduces the amount of care required in demolishing or removing existing plates.

Another object of the invention is to provide individual plenums sections with minimal use of sealant or hardware.

Another object of the invention is to provide a system where the drawbacks of applying the sealant/adhesive in varying weather conditions are eliminated.

Another object of the invention is to provide a porous plate module that is prefabricated or factory assembled, which eliminates the drawbacks of applying the sealant/adhesive in varying weather conditions.

Another object of the invention is to provide components that may be assembled under controlled conditions.

Another object of the invention is to reduce the expense and time required to construct or rehabilitate a filter underdrain system.

Another object of the invention is to eliminate the need for a technician during the installation of a new filter or during the replacement of an individual cell of an existing filtration system.

Another object of the present invention is to enable proper installation of an underdrain system with minimal supervision.

Another object of the invention is to eliminate the need for special installation equipment or hardware.

Another object of the present invention is to enhance the backwash process.

According to an aspect of a preferred embodiment of the invention, a modular filtration cell may be inserted between two cell dividers to simplify tank construction or rehabilitation.

According to another aspect of a preferred embodiment of the invention, a porous media support plate may be shipped pre-installed on a pre-fabricated plenum section to eliminate sealant/adhesive problems.

According to an aspect of a preferred embodiment of the invention, a module may be inserted into an existing cell to create a water circulation pattern, which enhances the backwash process.

According to another aspect of a preferred embodiment of the invention, a filtration replacement module or element may be provided having a first wall and a second wall coupled by a connection element with a porous plate located between the first and second walls.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE INVENTION

Figure 3:
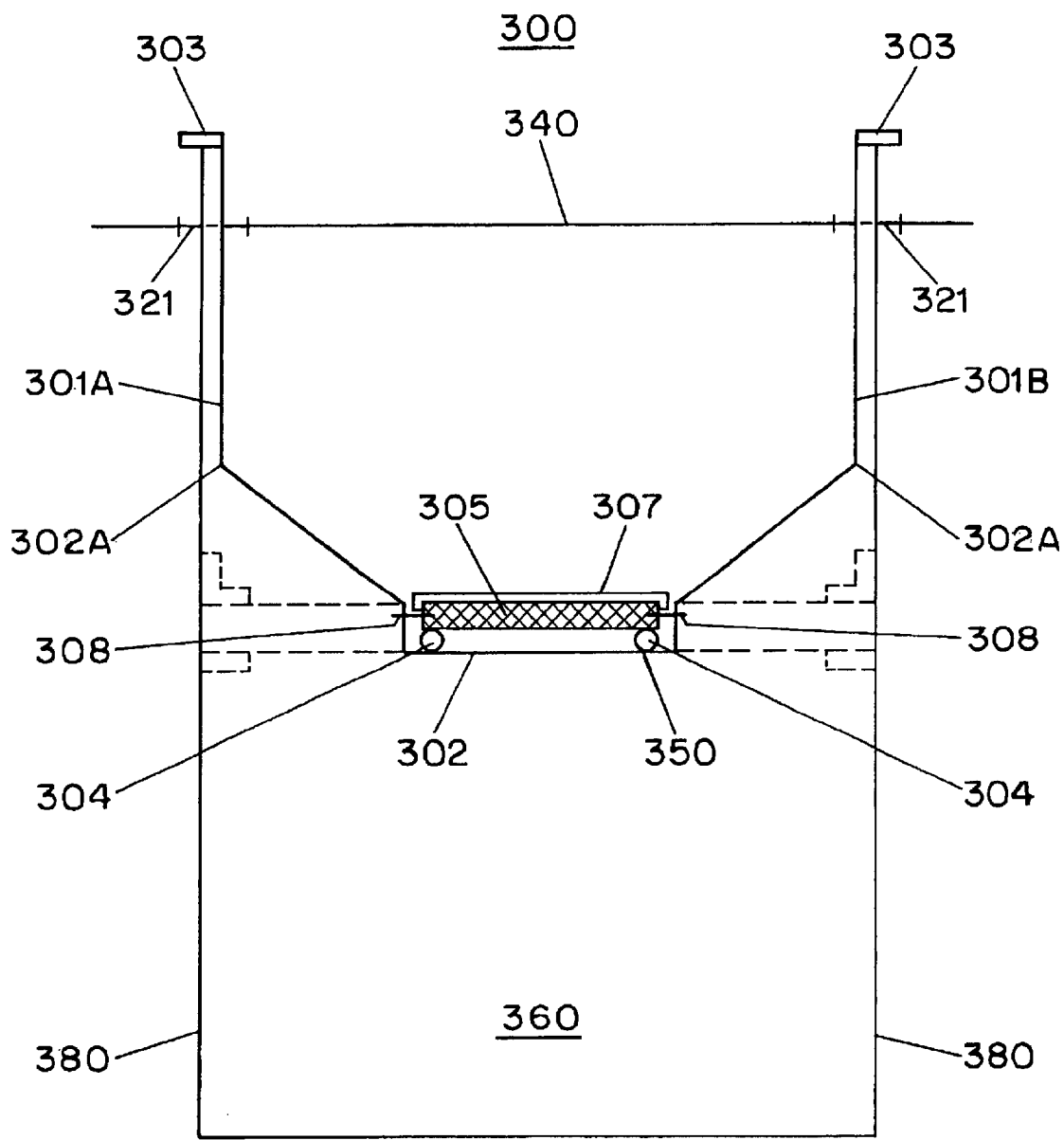
FIG. 3 is a cross section view of the present invention.
Figure 4:
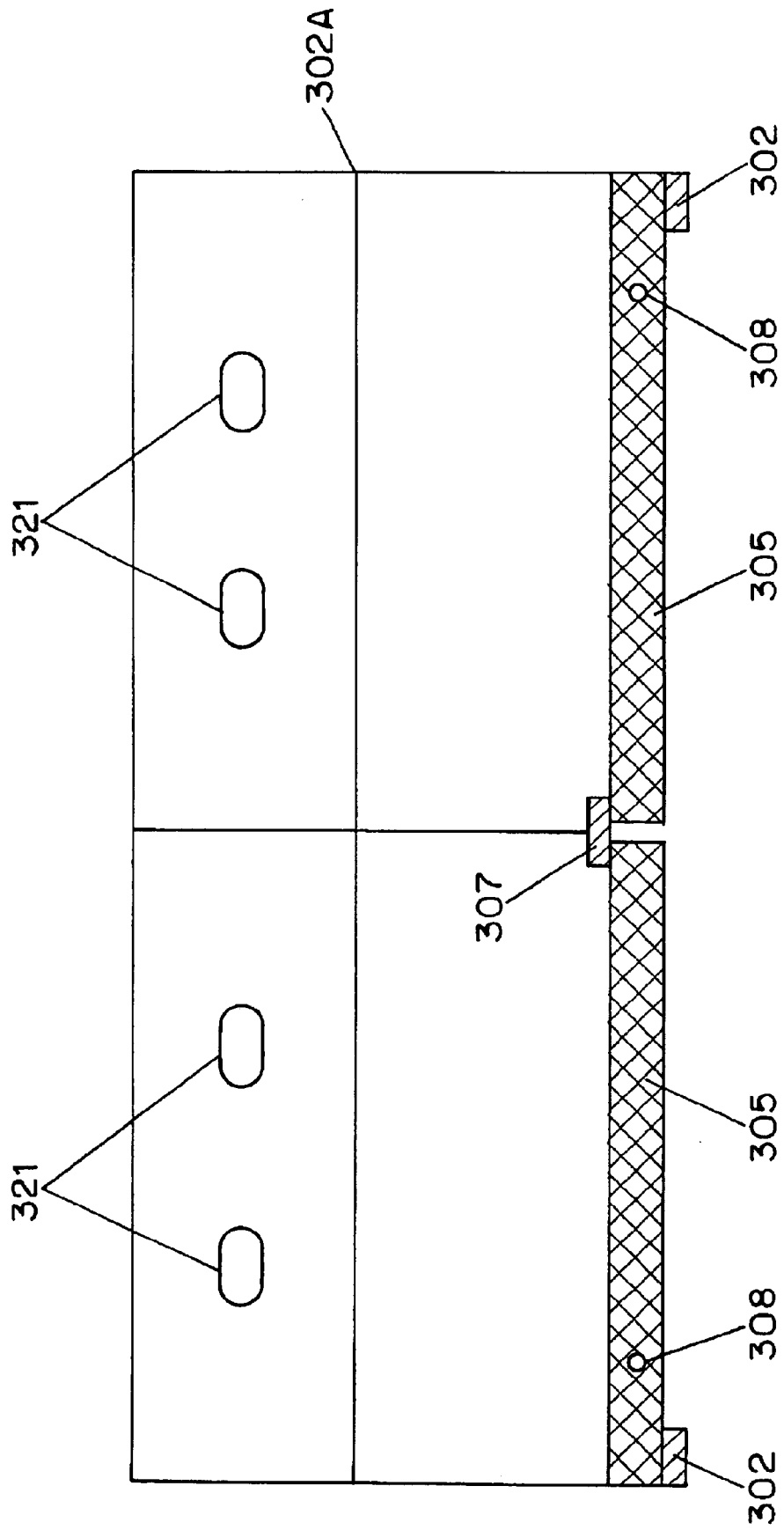
FIG. 4 is a longitudinal cross section view of the present invention.

FIGS. 3 and 4 illustrate a cross sectional views of a porous media support plate module (300), which may be used to construct a new filter underdrain or to rehabilitate an existing filter underdrain. A porous plate replacement module or element may be inserted between two existing cell dividers to replace a damaged porous media support plate, which may be allowing media to leak. The design of the replacement module provides an improved plenum structure, which enhances the backwash process. In an alternative embodiment, a porous plate module may be constructed to include the cell dividers and a plenum section, thus allowing the entire module to be constructed in a controlled environment.

Referring to FIG. 3, module (300) may include side wall (301A) connected to side wall (301B) by at least one or more connection strips (302). The strips may be any material that has sufficient strength to join the side walls together and may be attached by a variety of methods, e.g., bolts, screws, clamps, adhesive, etc.,. If more than one strap is provided, the structural strength of the module may be enhanced.

Each side wall (301A, 301B) has a small bend at a top edge (303), which is in communication with a respective cell divider (380). An adhesive/sealant may be applied to the junction between cell divider (308) and side wall (301A or 301B) to create a seal for plenum section (360). Of course, the step of applying an adhesive may be completed in a controlled environment before installation, such as the factory. On the other hand, the adhesive may be applied on site during installation.

In addition, module (300) may have slots (321), which accommodate assembly hardware (340). As an added option, slots (321) may be used as a stencil to mark a location on the cell dividers for drilling a hole to inserting hardware (340). The hardware may be any means to attach the module to the cell dividers, e.g., bolts, screws, clamps, adhesive, etc.

Furthermore, the module may have a porous plate support ledge (350), which may include a rod (304). Porous plates (305) are installed on porous plate support ledge (350), at the factory, using a sealant/adhesive material. Accordingly, rod (304) ensures that the adhesive forms a uniform and effective gasket when the porous plates are installed by providing a larger surface area with intricate spaces for the adhesive to create a labyrinth seal, which minimizes the likelihood of media leaks.

A hold-down strap (307) is installed at the joints between the porous plates to provide additional structural integrity as well as to provide a physical barrier to media leaks through the joint locations. Furthermore, a pin (308) may be provided at the edges of the porous plates to provide additional structural integrity and to resist upward movement of the plates during the backwash process.

Figure 1:
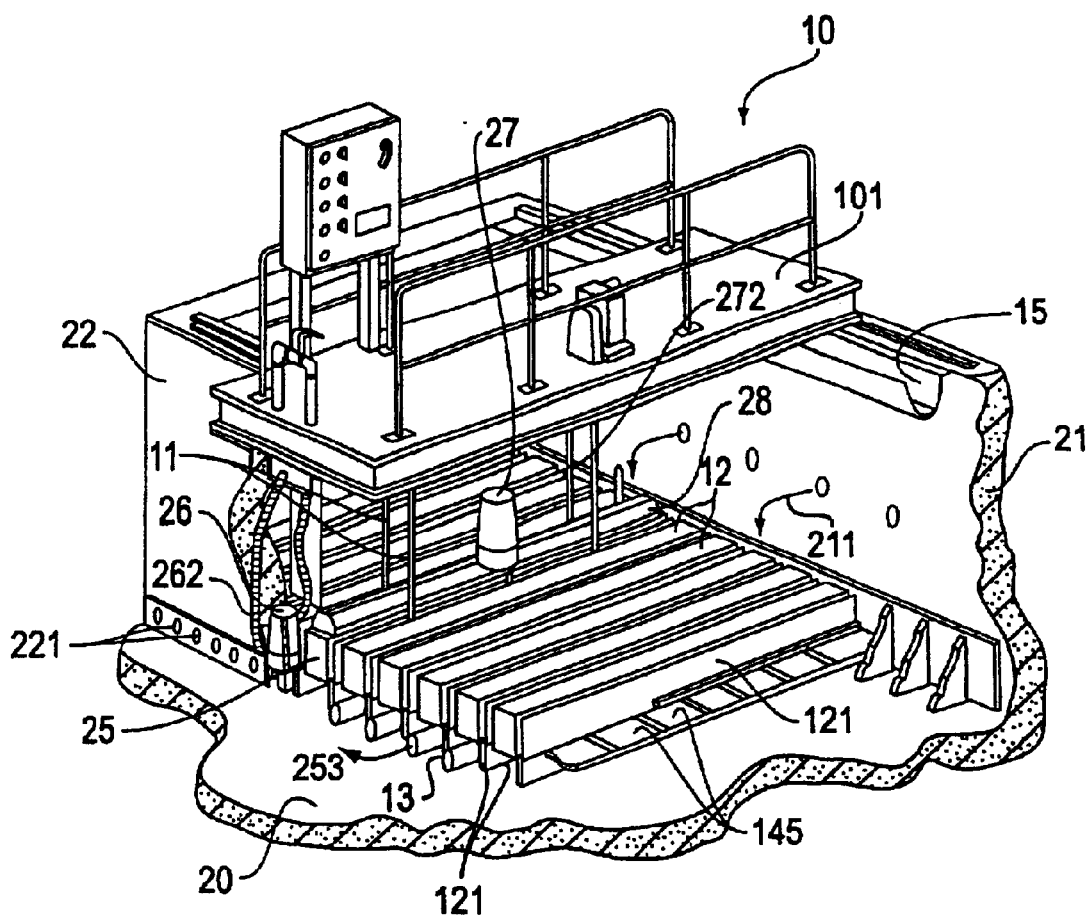
FIG. 1 is a perspective view illustrating a typical prior art traveling bridge filter.
Figure 2:
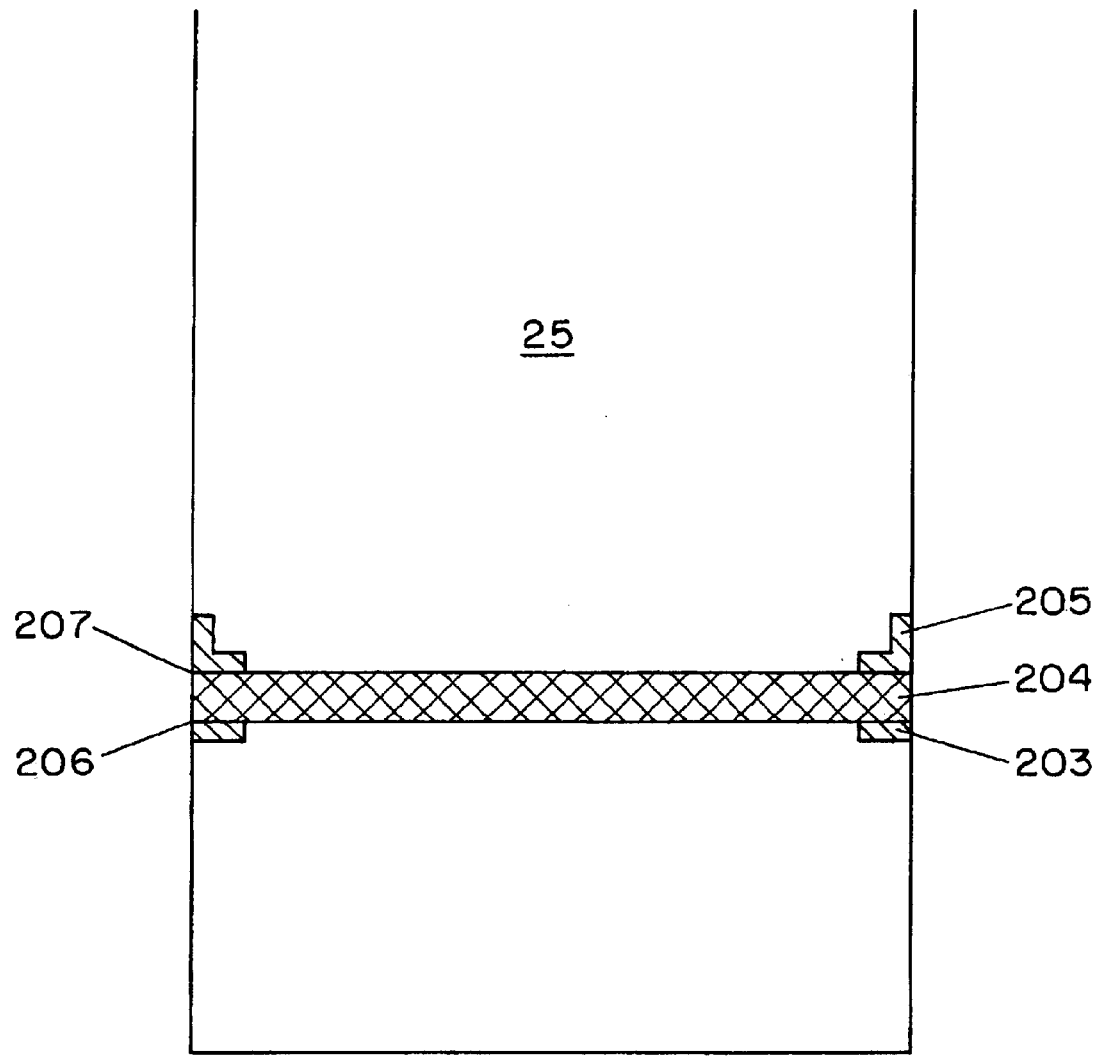
FIG. 2 is a cross section view of a prior art filtration cell.

Referring to FIGS. 2 and 3, the porous media support plate replacement module (300) installation steps may be as follows:

1. remove the existing media (25);
2. remove existing retention angles (205) and porous plates (204);
3. place the plate replacement module (300) between the existing cell dividers (380), and against the tank wall at the end of the cell;
4. drill through the existing cell divider (380) using the hardware slots (321) as a template;
5. pull the existing cell (380) divider firmly up against the plate replacement module (300) using the installation hardware (340);
6. apply caulking to seal the plate replacement module (300) against the tank wall; and
7. install new media.

When the installation of the replacement module is completed a plenum section (360) will be formed below the module. As mentioned previously, the module and the plenum section may be assembled at a factory and shipped to the site for installation as a replacement cell or as a cell for a new filtration system.

Figure 5:
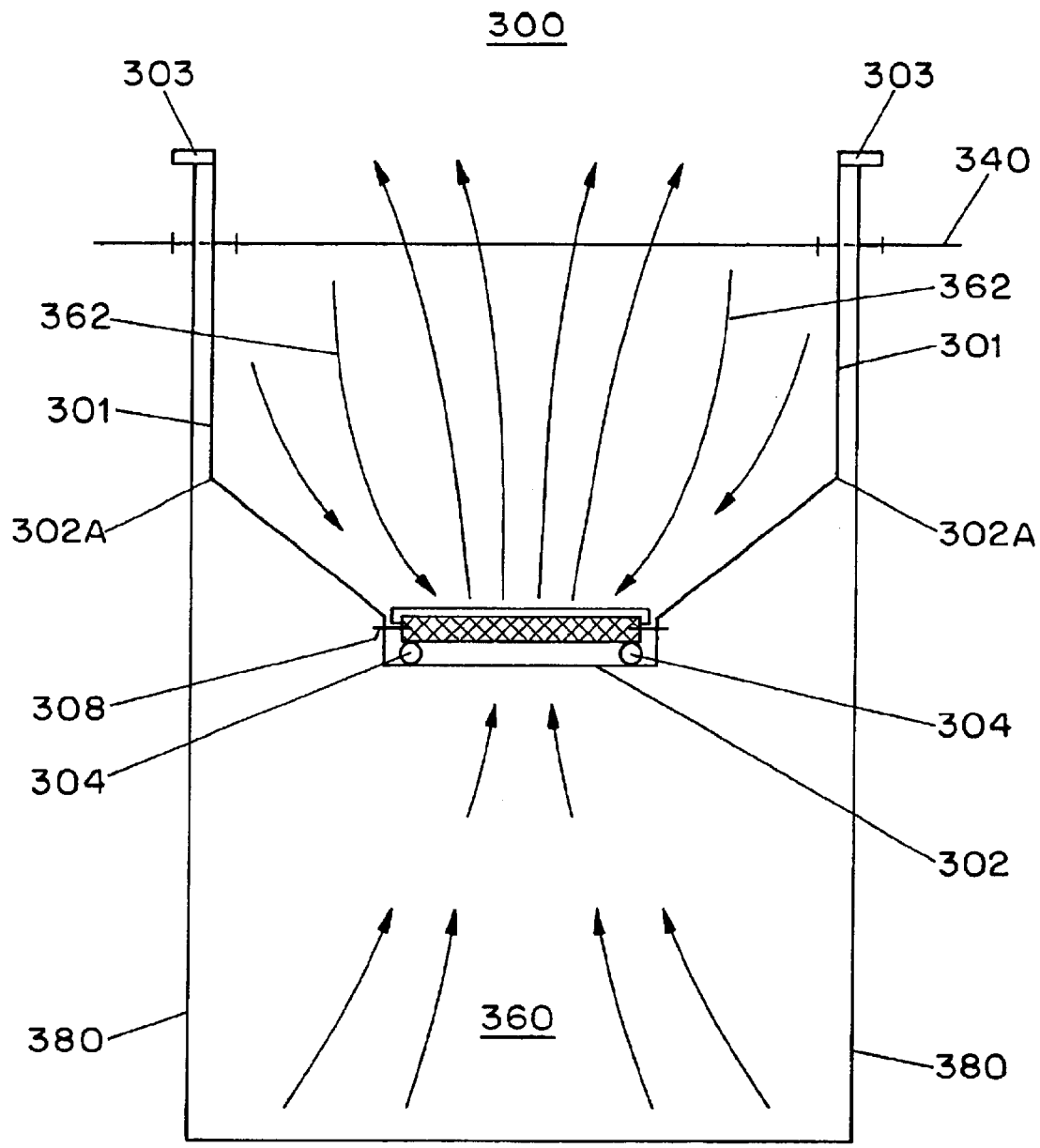
FIG. 5 is another cross section view of the present invention.

As illustrated in FIG. 3, the side walls of the module have a bend (302) that creates a "hopper bottom" profile. Accordingly, the bend in the side walls permit the water that is forced up form the plenum section (360) to circulate down (362) in the media, which increases particle interaction thus loosening waste and solids from the surface of media (25). FIG. 5 illustrates this new circulation pattern and it should be appreciated that this pattern is absent in the prior art. Later on, a traveling bridge will remove the loosen solid as taught in the prior art. Of course, the height and width dimensions of the hopper bottom may be varied to suit the various dimensions and media types that may be encountered in the existing cell.

Figure 6:
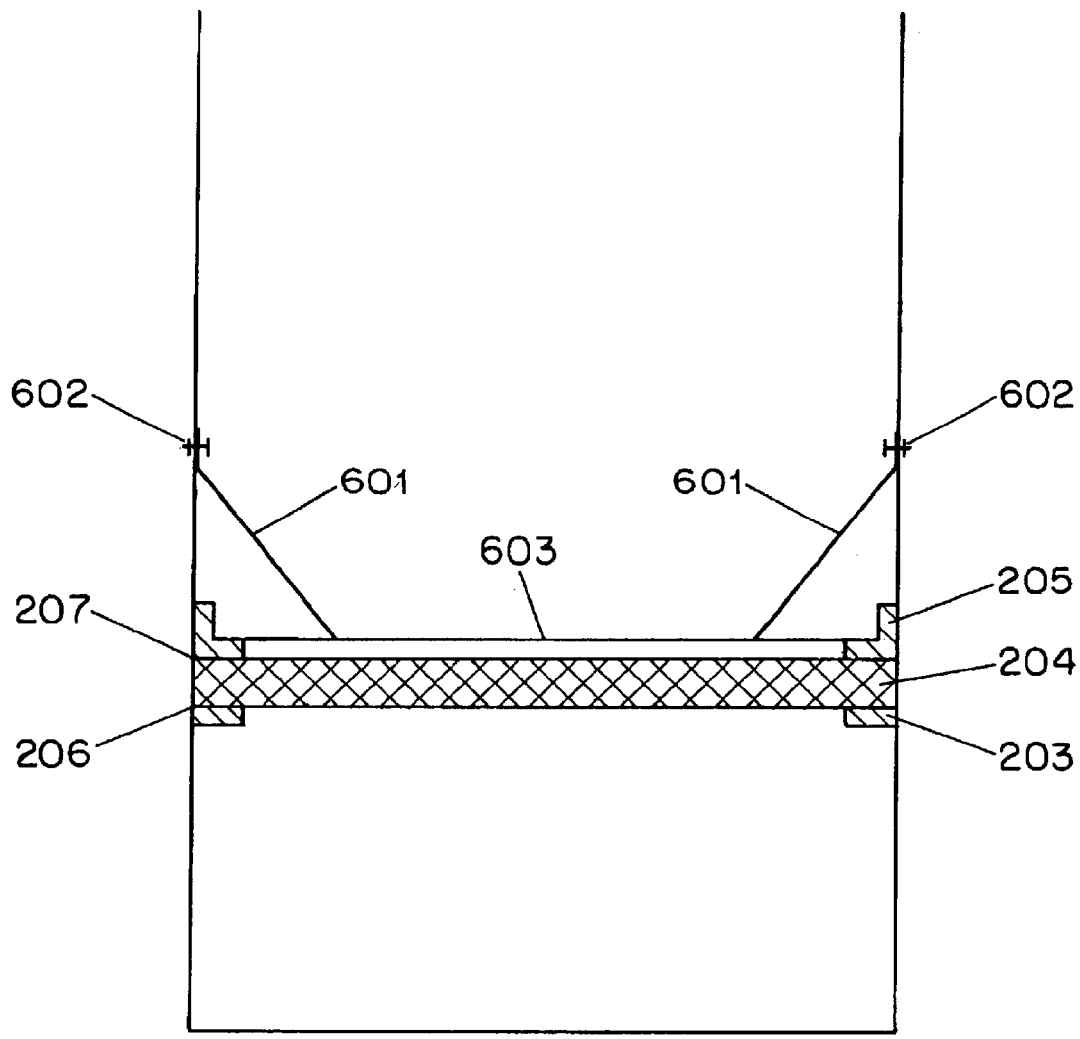
FIG. 6 is cross section view of another embodiment of the present invention.

In another embodiment, a module may be provided to permit the "hopper bottom" feature to be retrofitted into existing cells. Referring to FIG. 6, the angular "hopper" geometry may be provided by placing a spacer (601) in the respective corners of the cell. Accordingly, spacer (601) may be attached to an existing cell divider by hardware (602). The hardware may be any means to attach the module to the cell dividers, e.g., bolts, screws, clamps, adhesive, etc.,. In addition, an attachment bar (603) may provide a securing means for the left and right spacers. In alternative embodiment, the spacers may remain as separate modules. As with the previous embodiments, the altered shape of the cell enhances the backwash process. Of course, the height and width dimensions of the module may be varied to suit the various dimensions and media types that may be encountered in the existing cell.

Although the invention has been described in terms of preferred embodiments, these are not to be taken as limitations. The invention includes all variations and embodiments that fall within the scope of the claims.

What is claimed is:

1. In a traveling bridle filter having a plurality of filtration cells separated by cell dividers, the improvement comprising:

a replaceable filtration module inserted into at least one of said filtration cells, the replaceable filtration module including:

a first wall and a second wall extending adjacent to respective ones of the cell dividers forming said at least one filtration cell;

means for replaceably supporting the first and second walls on said respective ones of said cell dividers;

at least one connection element coupling said first wall to said second wall;

a porous filter plate carried by said at least one connection element and extending between said first wall and said second wall, said porous filter plate supporting a granular filter media during filtration; and said filtration module being insertable and removable as a unit into and from said at least one filtration cell.

2. The traveling bridge filter of claim 1, wherein the first and second walls each have a ledge to support opposite sides of the porous plate.

3. The traveling bridge filter of claim 2, comprising a rod disposed on each ledge.

4. The traveling bridge filter of claim 3, comprising an adhesive around the rod to secure the porous plate to the ledge.

5. The traveling bridge filter of claim 1, wherein the porous plate is secured to the first and second walls by a restraining element.

6. The traveling bridge filter of claim 1, wherein lower portions of said first and second walls are inclined inwardly towards the center of said at least one filtration cell to form a hopper.

7. The traveling bridge filter of claim 6, wherein the porous filter plate extends between said lower portions of said first and second walls.

* * * * *